(12) United States Patent
Erdman et al.

(10) Patent No.: US 8,058,742 B2
(45) Date of Patent: Nov. 15, 2011

(54) THERMAL MANAGEMENT SYSTEM FOR WIND TURBINE

(75) Inventors: William Erdman, Moraga, CA (US); Kevin L. Cousineau, Lompoc, CA (US)

(73) Assignee: Clipper Windpower, Inc., Carpenteria, CA (US)

( * ) Notice: Subject to any disclaimer, the term of this patent is extended or adjusted under 35 U.S.C. 154(b) by 341 days.

(21) Appl. No.: 12/282,084

(22) PCT Filed: Feb. 22, 2007

(86) PCT No.: PCT/IB2007/000439
§ 371 (c)(1),
(2), (4) Date: Sep. 8, 2008

(87) PCT Pub. No.: WO2007/110718
PCT Pub. Date: Oct. 4, 2007

(65) Prior Publication Data
US 2009/0045628 A1 Feb. 19, 2009

(51) Int. Cl.
*F03D 11/00* (2006.01)
(52) U.S. Cl. ........................................ 290/55
(58) Field of Classification Search .................. 290/55; 62/3.4; 415/1
See application file for complete search history.

(56) References Cited

U.S. PATENT DOCUMENTS

| 6,676,122 | B1 * | 1/2004 | Wobben | 290/55 |
| 7,154,191 | B2 * | 12/2006 | Jansen et al. | 290/55 |
| 7,365,446 | B2 * | 4/2008 | Wobben | 290/55 |
| 7,436,084 | B2 * | 10/2008 | Wobben | 290/55 |
| 7,748,946 | B2 * | 7/2010 | Wan | 415/1 |
| 7,837,126 | B2 * | 11/2010 | Gao | 236/44 C |
| 7,874,165 | B2 * | 1/2011 | Wobben | 62/3.4 |
| 2007/0013194 | A1 * | 1/2007 | Calley | 290/44 |
| 2007/0024132 | A1 * | 2/2007 | Salamah et al. | 310/64 |
| 2009/0212560 | A1 * | 8/2009 | Larsen | 290/2 |

FOREIGN PATENT DOCUMENTS

| DE | 3029781 A1 * | 6/2005 |
| DE | 10352023 A1 * | 6/2005 |
| WO | WO 03014629 A1 * | 2/2003 |
| WO | WO 2010069954 A1 * | 6/2010 |

\* cited by examiner

*Primary Examiner* — Joseph Waks
(74) *Attorney, Agent, or Firm* — Fay Sharpe LLP

(57) ABSTRACT

A wind turbine includes a wind turbine tower and a power electronic control system located within the wind turbine tower. The power electronic control system includes heat generating components. The heat generating components are directly mounted to the inner surface of the wind turbine tower dissipating the heat generated by the heat generating components directly to the inner surface of the wind turbine tower. In this way, a good thermal conducting path to the entire wind turbine tower is provided. A method for conducting heat generated in electronic equipment housed within a wind turbine tower uses the tower as a heat sink for cooling purposes.

13 Claims, 3 Drawing Sheets

PRIOR ART

THERMAL MANAGEMENT SYSTEM FOR WIND TURBINE

FIELD OF THE INVENTION

This invention relates to wind turbines housed in a nacelle atop a tall tower, and more particularly to an apparatus for removing heat from inside a wind turbine tower.

DESCRIPTION OF THE PRIOR ART

As wind generated electricity becomes commonplace in many locations around the world, there becomes a desire to make wind turbine installations more aesthetic. One specific concern has been the location of control cabinets, which are placed outside of the turbine towers where they become openly visible. To address this concern, it has recently become common to place the control system cabinets within the wind turbine tower. There typically is sufficient space to accommodate such cabinets, but there can be serious thermal management problems. For example, in variable speed wind turbines, where a power electronic converter control system is commonly used, there can be significant heat generation by the converter control system. Consider for example, a full converter system with 96% efficiency in a 1.5 MW turbine. This means that 4% of 1.5 MW, or 60 kW is dissipated by the converter. If the converter is placed in the tower without adequate air movement a large temperature rise within the tower can result. This high temperature can be detrimental to the life of the converter control system and other required components within the tower. To deal with this temperature rise, large air movement fans have been placed in the tower to exhaust hot air; however, removing materials by cutting holes in the tower is undesirable for reasons discussed later. It would be best to find an alternative method of removing the heat from inside the tower.

In the prior art, a wind turbine tower structure is used to elevate a turbine. The tower provides static and dynamic support for mechanical loads subjected to the up-tower structure. It is customary for the tower to have an entry door at the base of the tower. This door is vented to allow the passage of outside air into the tower. In addition to the entry door, an opening is placed 180 degrees from the door to allow for additional air to enter the tower on the side opposite the door. The additional tower cutout is undesirable as it weakens the tower structure yet it is required to allow for adequate air entry into the tower.

In the case of a variable speed wind turbine the generator is electrically connected to the power electronic control system inside the tower base via electrical pendant cables. The same is true for a constant speed wind turbine except that the control system at the bottom of the tower is more conventional electromechanical or power electronic switchgear rather than a variable speed converter. The control system sits on a platform. Heat removal from the control system is accomplished by heat sinks at the top of a control system cabinet. Heat generated by the control system is moved to the heat sink where fans blow air over the heat sinks to remove the heat. The heat however remains in the tower and this would cause a rise in tower temperature if it were not for placement of exhaust cutouts at the top of the tower. Active fans cause the rising hot air to be forced outside of the tower just below the top of the tower.

There are many undesirable consequences of this approach to removing heat from inside the tower. First, the approach requires three additional cutouts beyond the maintenance door for purposes of drawing in cold air and exhausting hot air. These additional cutouts weaken the tower structurally and they can result in the need to add steel, which adds cost to the tower structure. Secondly, the approach draws contaminants into the tower, which, depending on the environment, can be corrosive and detrimental to the control system, pendant cables and other in-tower components. Lastly, the exhaust fans at the top of the tower can contribute a great deal of audible noise to the area surrounding the turbine.

It is an object of the present invention to find an improved method an apparatus of moving heat generated by a control system inside a tower to the outside of the tower.

SUMMARY OF THE INVENTION

The object of the present invention is solved by an apparatus in a wind turbine tower comprising heat transfer means for conducting heat losses generated by an electronic control system to a surface of said tower so that said tower, which is subjected to prevailing wind, acts as a heat sink. The present invention provides a novel apparatus and method for removing the heat from inside a wind turbine tower containing a power electronic converter in a variable speed wind turbine or alternatively from switchgear in a constant speed wind turbine. In either case, the invention provides a unique approach to removing the losses from either control system. Therefore, the invention is based on the idea of using the tower as a heat sink.

In one embodiment the heat transfer means may comprise a copper tube, which is in thermal contact with said tower and said electronic control system. Using a copper tube has the advantage that installation of the relevant tube is very easy and that no further electronic devices have to be used for operating the heat transfer means.

In another embodiment the heat transfer means may comprise a flat inner surface of said tower upon which components of said electronic control system are mounted so as to dissipate heat directly to said tower. In this embodiment the tower may comprise a surface which is machined to accommodate the components. The components usually comprise a flat surface, but may also comprise a curved surface to adapt the component to the inner surface of the tower.

In another embodiment liquid-to-air heat exchangers are placed at intervals over an outside surface of said tower, said heat exchangers being exposed to the wind, so that a transfer of heat occurs by liquid cooling said electronic control system components by circulating the liquid through said one or more liquid-to-air heat exchangers, which are thermally attached to said tower. Compared to the usage of a copper tube for the heat transfer means an apparatus according to this embodiment can transfer greater amounts of heat. Therefore, an apparatus according to this embodiment is suitable for large wind turbine towers since it is capable of removing great amounts of energy.

One great advantage of the apparatus according to the present invention is the capability for it to be customized for a large range of turbines due to the different amounts of heat conducted by the different heat transfer means.

The object of the present invention is further solved by a method for removing heat from inside a wind turbine tower, the wind turbine tower comprising a heat generating electronic control system, wherein the method comprises the steps of transferring the heat to a surface of the tower and dissipating at least a part of the heat to the tower.

In other words, the invention provides a method for conducting losses generated in the converter or switchgear to the tower and for using the tower as a heat sink for cooling purposes.

In one embodiment the heat generated by the electronic control system is absorbed by a fluid, the fluid transferring the heat to a surface of the tower and dissipating at least a part of the absorbed heat to the tower. Using a fluid for transferring the heat to a surface of a tower provides the advantage of transferring a great amount of heat to the tower. Therefore, the method according to this embodiment is preferred when using a electronic system which generates a great amount of heat.

For dissipating the heat absorbed by the fluid it is preferred that the fluid is circulated through one or more heat exchangers, which are thermally attached to a surface of the tower. The usage of one or more heat exchangers makes it possible to dissipate a larger amount of heat to the tower as well as dissipating the heat faster.

In a preferred embodiment the heat exachangers are attached to the outer surface of the tower. Of course, the at least one heat exchanger may be attached at the inner surface of the tower, however, attachment to the outer surface of the tower has the advantage that the heat exchanger may dissipate the heat not only to the tower but also to the wind the tower is exposed to.

The heat exchangers may be attached at intervals over the outside circumference of the tower. In this case, the highest power dissipations occur at the highest wind speeds where heat removal is the greatest.

It should be appreciated that every fluid capable of transferring heat may be used in connection with the present invention. However, it is preferred to use a fluid with a high heat capacity.

The transfer of heat may occur by liquid cooling the converter or switchgear and by circulating the liquid through a heat exchanger, which is thermally attached to the tower. The wind blowing over the tower at high wind speeds and power levels then cools the tower.

One simple approach to move the losses to the tower includes using a metal tube, which is in thermal contact with the tower and converter. It is preferred to use a copper tube. However, any material with a high heat capacity may be used. The selection of the material used for the tube is accomplished while taking into consideration the amount of heat which has to be transferred.

Another approach uses a method of thermally mounting components, which dissipate heat directly to the tower. In a preferred embodiment the electronic control system comprises heat generating flat components, the heat being transferred through the flat surface of the components onto the inner wall of the tower.

In all embodiments however, the tower standing in the wind is used as the main method for removing heat from the control system.

BRIEF DESCRIPTION OF THE DRAWINGS

The invention will be described in detail with reference to the drawings in which.

DESCRIPTION OF THE PREFERRED EMBODIMENTS

Figure 1:
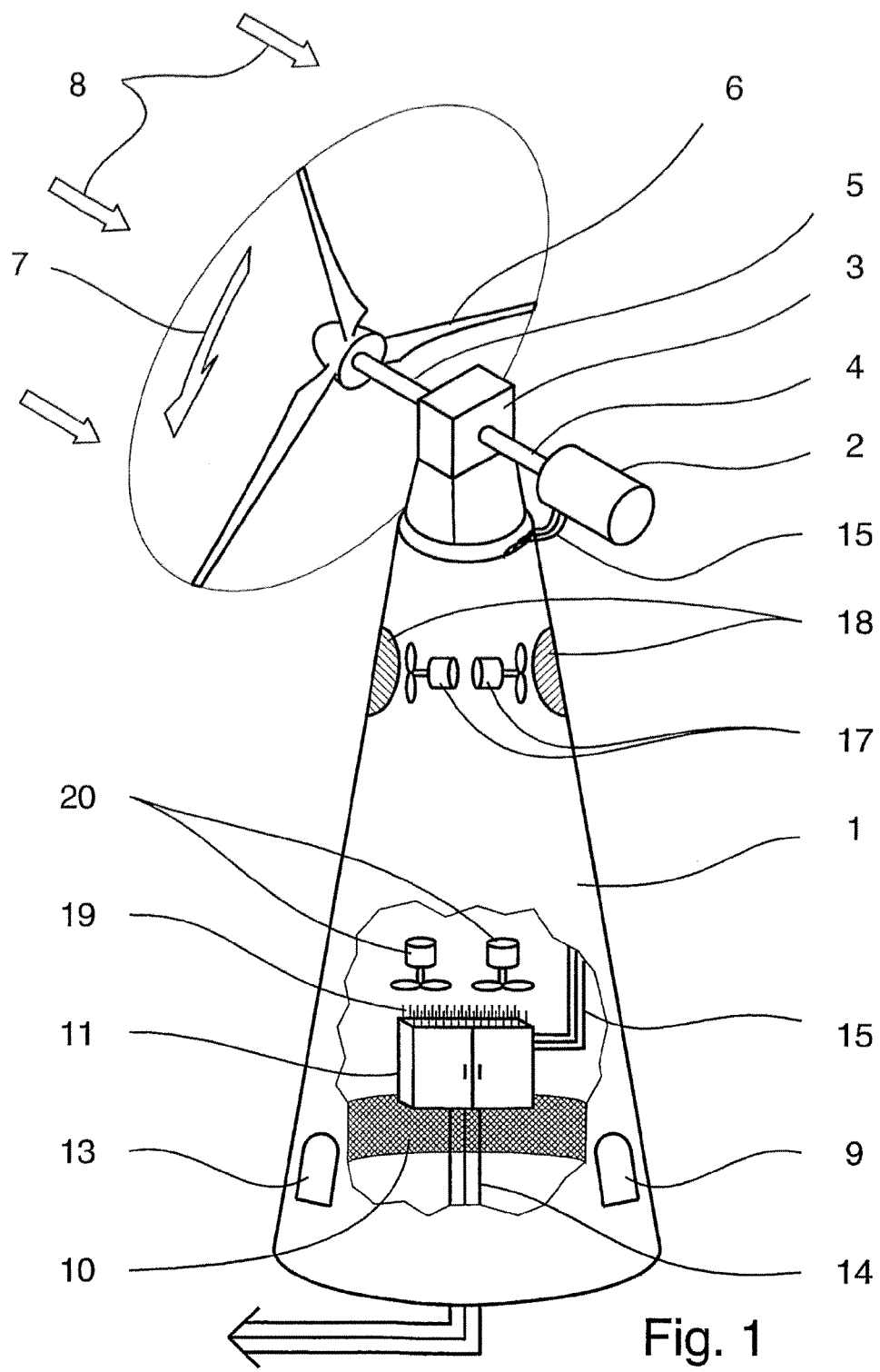
FIG. 1 is a perspective view of a prior art wind turbine tower with air-cooling ventilators.

FIG. 1 is an example of existing art used to remove the heat generated inside of a wind turbine tower. In this figure a wind turbine is shown facing the incoming wind 8. This wind creates lift on the wind turbine blades 6 causing rotation of the entire rotor 7. Rotation of the rotor results in rotation of the low speed mainshaft 5 which is the mechanical input to speed increaser 3. The mechanical output of the speed increaser is the high-speed shaft 4, which is connected to a high-speed generator 2. The gear ratio of the gearbox 3 is selected to match the required speed of the low speed shaft 5 to that of the high-speed generator 2 and shaft 4. The wind turbine tower structure is identified as 1 in the figure. This structure is used to elevate the turbine and provides static and dynamic support for mechanical loads subjected to the up tower structure. It is customary for the tower to have an entry door as shown at 9 and this door is vented to allow the passage of outside air into the tower. In addition to the door, an opening is placed 180 degrees from the door to allow for additional air to enter the tower at 13. The additional tower cutout is undesirable as it weakens the tower structure yet it is required to allow for adequate air entry into the tower 1.

Further in FIG. 1, in the case of a variable speed wind turbine the generator is electrically connected to the power electronic control system 11 via electrical pendant cables 15. The same is true for a constant speed wind turbine except that the control system at the bottom of the tower 11 is more conventional electromechanical or power electronic switchgear rather than a variable speed converter. The control system 11 sits on a platform 10. Heat removal from the control system 11 is accomplished by heat sinks 19 shown at the top of the control system cabinet 11. Heat generated by the control system is moved to the heat sink 19 where the fans 20 blow air over the heat sinks to remove the heat. The heat however remains in the tower and this would cause a rise in tower temperature if it were not for the exhaust tower cutouts 18 at the top of the tower. Active fans 17 cause the rising hot air to be forced outside of the tower just below the top of the tower.

There are many undesirable consequences of this approach to removing heat from inside the tower. First, the approach requires three additional cutouts beyond the maintenance door for purposes of drawing in cold air and exhausting hot air. These additional cutouts weaken the tower structurally and they can result in adding additional steel and cost to the tower structure. Secondly, the approach draws contaminants into the tower which, depending on the environment can be corrosive and detrimental to the control system, pendant cables and other in-tower components. Lastly, the exhaust fans at the top of the tower can contribute a great deal of audible noise to the area surrounding the turbine. For these reasons, it would be desirable to find an improved approach to moving the heat generated by the control system outside of the tower.

Figure 2:
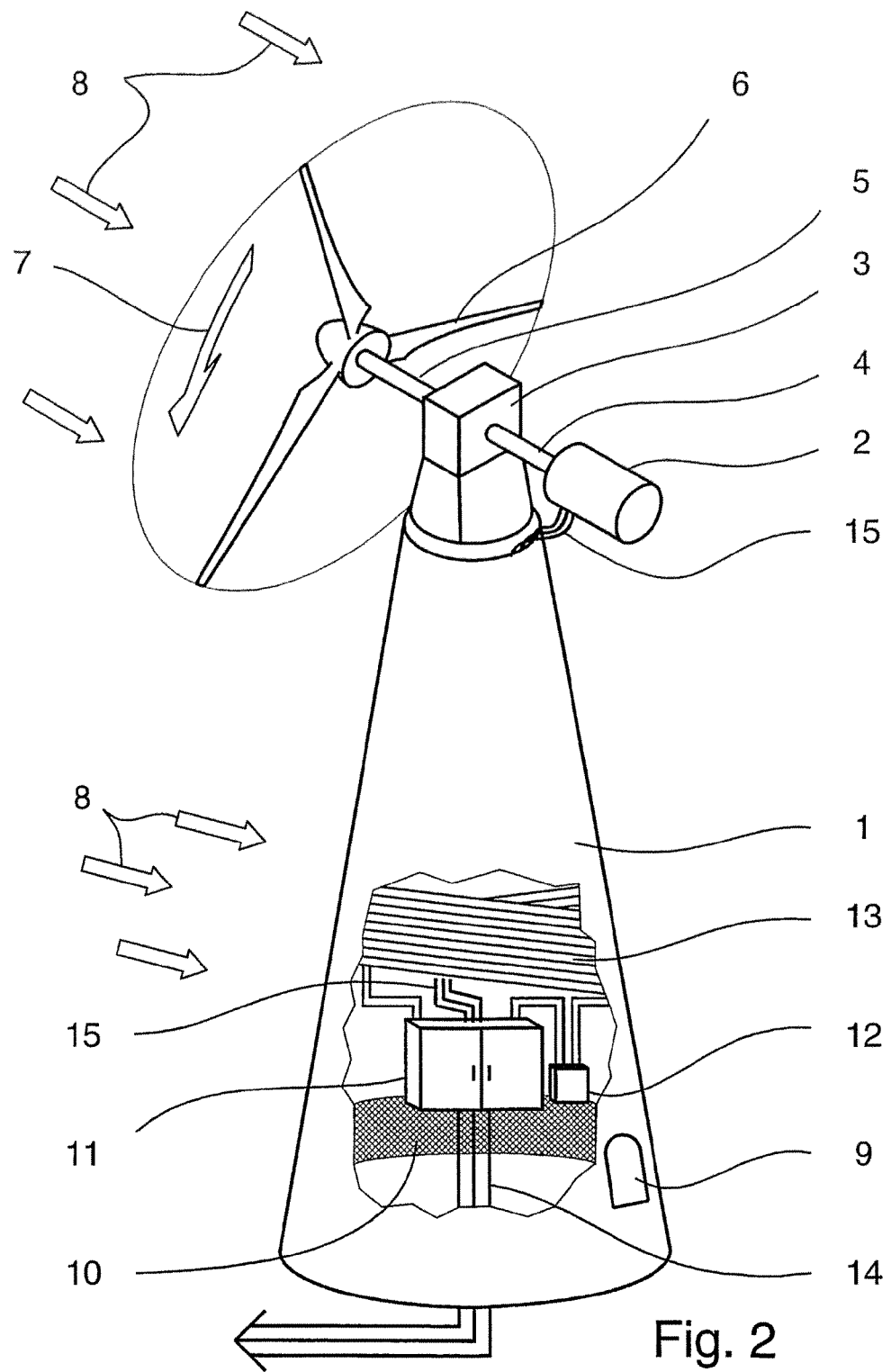
FIG. 2 is a perspective view of a thermal management system within turbine tower in accordance with the invention; and, FIG. 3 is a more detailed view of the thermal management system shown in FIG. 2.
Figure 3:
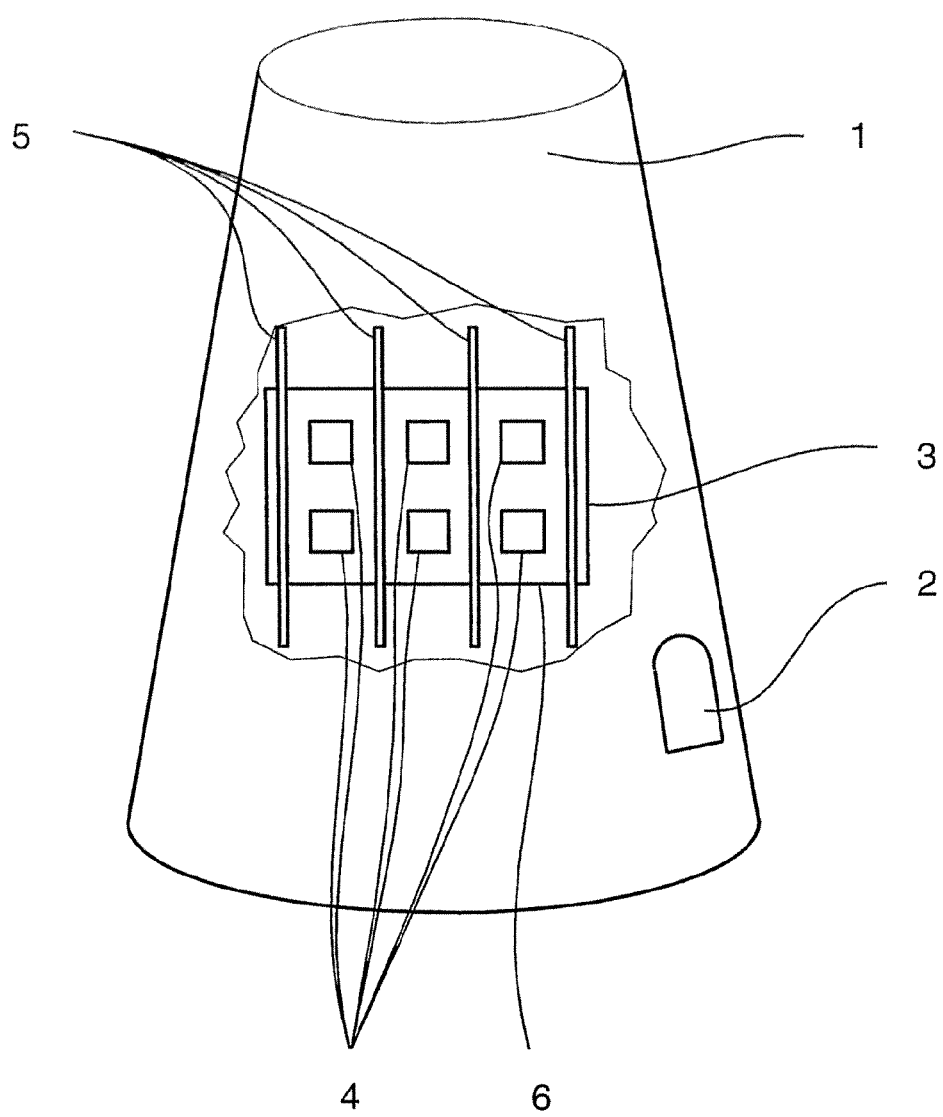

FIG. 2 and FIG. 3 disclose different aspects of the invention. One skilled in the art will readily recognize from the following discussion that alternative embodiments of the structures and methods illustrated herein maybe employed without departing from the principles of the invention.

Refer to FIG. 2, which provides an overview of the invention. A wind turbine is shown facing the incoming wind 8. This wind creates lift on the wind turbine blades 6 causing rotation of the entire rotor 7. Rotation of the rotor results in rotation of the low speed main shaft 5, which is the mechanical input to speed increaser 3. The mechanical output of the speed increaser is the high-speed shaft 4, which is connected to a high speed generator 2. The gear ratio of the gearbox 3 is selected to match the required speed of the low speed shaft 5 to that of the high-speed generator 2 and high-speed shaft 4. The wind turbine tower structure is identified as 1 in the figure. This structure is used to elevate the turbine and provide static and dynamic support for mechanical loads on the up tower structure. It is customary for the tower to have an entry door as shown at 9. Because the tower is a load carrying structure, cutting holes to allow for the removal of heat is highly undesirable.

Further in FIG. 2, in the case of a variable speed wind turbine the generator is electrically connected to the power electronic control system 11 via electrical pendant cables 15. The same is true for a constant speed wind turbine except that the control system at the bottom of the tower 11 is more conventional electromechanical or power electronic switchgear rather than a variable speed converter. The control system sits on a platform 10 and contains a liquid cooling system consisting of tubing 13 and circulating pump 12. The electrical input to the control system is from the generator pendant cables 15 and the control system output electrical power is connected to the turbine's padmount transformer via underground conductors 14 shown exiting the base of the tower. The circulating pump causes liquid to flow across the heat generating portion of the control system. This liquid is heated up by the control system and exits at an elevated temperature. The liquid is made thermally conductive to the tower via a tube spiral as shown 13. As the liquid passes through the tubing 13 it gives up its heat to the tower 1. Wind 8 blowing over the tower 1 causes the heat that was supplied to the tower to be dissipated in the wind. Since the heat is finally carried away by the wind, no significant heat within the tower occurs. Low temperature liquid at the other end of the tube spiral is then circulated back to the inlet of the control system through tubing 13. There are numerous methods for attaching the tubing to the wind turbine tower. For example, welding, brazing, or thermal bonding would all be acceptable methods. The number of turns and height of the tube spiral can be sized based on the kW's to be removed from the control system; more height would permit for the dissipation of more kW's for a desired temperature rise. It is customary to remove five to hundreds of kW's while trying to maintain temperature rises of 10-80 Degrees Celsius.

A second approach to moving the heat from the control system outside of the tower is shown in FIG. 3. This approach uses a similar tower structure 1 to that already discussed. A cutout of the tower is shown in the figure revealing the invention inside the tower. A machined flat surface 6 is provided on one side of the tower 1. The surface 6 is machined so that it will accept flat components 4 to be mounted to it providing a good thermal conducting path to the entire tower 1. Common components 4 used in the control system are electronic modules containing IGBT's, SCR's, and diodes. Such modules are designed to be mounted to flat surfaces. The heat generated by these components 4 is then transferred through the flat surface and onto the interior wall of the tower 1. Elements 5 are heat pipes used to better transfer the heat flux from the components 4 to a larger surface of the tower. The sizing of the heat pipes is determined by the amount of heat flux to be moved. The higher the heat flux, the longer the heat pipes. The heat pipes are thermally connected to the tower by means of welding, brazing, or thermal bonding and serve to transfer the heat of component 4 to a larger surface of the tower. In some applications, it may not be necessary to use the heat pipes.

The features and advantages described in this specification is not all inclusive, and particularly, many additional features and advantages will be apparent to one of ordinary skill in the art in view of the figures, specification, and claims hereof. Moreover, it should be noted that the language used in the specification has been principally selected for readability and instruction purposes, and therefore resort to the claims if necessary to determine the inventive subject matter.

The invention claimed is:

1. A wind turbine comprising:
   a wind turbine tower including a tower wall having an inner surface defining a generally enclosed space inside the wind turbine tower and an outer surface,
   a power electronic control system located within the wind turbine tower, the power electronic control system comprising heat generating components located in the tower, wherein the heat generating components are mounted to the inner surface of the tower wall of the wind turbine tower so that the heat generated by the heat generating components is transferred to the inner surface of the tower wall, and then by conduction through the tower wall to the outer surface thereof where heat is dissipated into ambient air.

2. The wind turbine of claim 1, wherein a flat surface is provided on one side of the wind turbine tower and wherein the heat generating components comprise a flat surface.

3. The wind turbine of claim 1, wherein the wind turbine comprises a plurality of heat pipes used to better transfer the heat generated by the heat generating components to a larger surface of the wind turbine tower.

4. The wind turbine of claim 3, wherein the heat pipes are thermally connected to the wind turbine tower by means of welding, brazing, or thermal bonding.

5. The wind turbine of claim 1 further comprising:
   a conduit system containing a liquid coolant; and
   a pump connected to the conduit system for moving the liquid coolant through the conduit system, the system including a first section in thermal contact with the heat generating components and a second section in thermal contact with the tower inner wall.

6. The wind turbine of claim 5 wherein the conduit system includes a tube spiral connected to the tower.

7. A method for removing heat from inside a wind turbine tower, comprising a power electronic control system located within the wind turbine tower, the power electronic control system includes heat generating components, wherein the method comprises the steps of:
   a) directly transferring the heat from the heat generating components of the power electronic control system to an inner surface of a tower wall of the wind turbine tower; and
   b) dissipating at least a part of the heat to the wind turbine tower which acts as a heat sink.

8. A cooling assembly for a power electronic control system of a wind turbine comprising:
   a tower, including a tower wall with an inner surface and an outer surface, the tower wall generally enclosing a space inside the tower;
   a power electronic control system located inside the tower, the control system comprising at least one heat generating component; and
   wherein the heat generating component is mounted to the tower wall inner surface so that the heat generating component can be cooled via thermal contact with the tower which acts as a heat sink.

9. The assembly of claim 8 wherein the assembly further comprises at least one heat pipe thermally connected to both the heat generating component and the tower.

10. The assembly of claim 8 wherein the assembly further comprises a liquid cooling system including a first conduit section in thermal contact with the heat generating component, a second conduit section in thermal contact with the tower inner wall; and
    a pump connected to the liquid cooling system for moving a liquid coolant in the liquid cooling system between the first conduit section and the second conduit section.

11. The assembly of claim 10 wherein the liquid cooling system second conduit section comprises a tube spiral connected to the tower inner wall.

12. The assembly of claim 11 wherein the tube spiral is connected to the tower by means of welding, brazing or thermal bonding.

13. The assembly of claim 8 wherein the tower inner wall includes a generally flat surface for accommodating the at least one heat generating component and wherein the tower outer wall is curved.

* * * * *